(12) United States Patent
Taylor et al.

(10) Patent No.: US 7,376,223 B2
(45) Date of Patent: *May 20, 2008

(54) METHOD AND SYSTEM FOR CONNECTING A SUBSCRIBER TO AN ADVERTISER PRIOR TO CALL COMPLETION

(75) Inventors: William Scott Taylor, Duluth, GA (US); David E. Massengill, Covington, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/711,370

(22) Filed: Feb. 27, 2007

(65) Prior Publication Data

US 2007/0160185 A1 Jul. 12, 2007

Related U.S. Application Data

(63) Continuation of application No. 10/253,202, filed on Sep. 24, 2002, now Pat. No. 7,184,529.

(51) Int. Cl.
*H04M 15/00* (2006.01)
*H04M 3/42* (2006.01)

(52) U.S. Cl. .............................. 379/114.13; 379/201.01; 379/207.02

(58) Field of Classification Search ........... 379/114.13, 379/201.01, 207.02
See application file for complete search history.

(56) References Cited

U.S. PATENT DOCUMENTS

| | | | |
|---|---|---|---|
| 6,038,305 A | 3/2000 | McAllister | |
| 6,088,440 A | 7/2000 | Millar et al. | |
| 6,351,639 B1 | 2/2002 | Motohashi | |
| 6,418,330 B1 | 7/2002 | Lee | |
| 6,608,891 B1 | 8/2003 | Pelletier et al. | |
| 6,665,390 B1 | 12/2003 | Ekstrom | |
| 7,184,529 B1* | 2/2007 | Taylor et al. | 379/114.13 |
| 2002/0114437 A1 | 8/2002 | Nabkel et al. | |
| 2002/0131574 A1 | 9/2002 | Alleman | |

(Continued)

OTHER PUBLICATIONS

John Tagliabue, "Europe Offering Free Calls But First, a Word From . . . "., New York Times, Sep. 28, 1997.

*Primary Examiner*—Barry Taylor
(74) *Attorney, Agent, or Firm*—Merchant & Gould

(57) ABSTRACT

A method and system are provided for connecting a subscriber to an advertiser prior to call completion in an intelligent telecommunications network. A subscriber telephone line is provisioned to receive advertisements which are stored in an originating switch in the telecommunications network. Once the subscriber dials a telephone number to call another party, the switch delays normal call processing and begins playing the advertisement to the subscriber. If the subscriber wishes to be connected to the advertiser, she may provide a predetermined input to the switch. The switch, upon receiving the predetermined input, retrieves routing information, including the telephone number associated with the advertiser, from a network component and connects the subscriber with the advertiser. If the subscriber does not wish to be connected to the advertiser, the subscriber may wait a predetermined period after playback of the advertisement to be automatically connected to the telephone number of the originally called party. The subscriber may also cancel the advertisement during playback to be connected to the originally called party. The switches and network components in the telecommunications network may be advanced intelligent network (AIN) components.

20 Claims, 2 Drawing Sheets

U.S. PATENT DOCUMENTS

2003/0002657 A1    1/2003   Seelig et al.
2003/0086558 A1    5/2003   Seelig et al.
2004/0067751 A1    4/2004   Vandermeijden \* cited by examiner

US 7,376,223 B2

METHOD AND SYSTEM FOR CONNECTING A SUBSCRIBER TO AN ADVERTISER PRIOR TO CALL COMPLETION

CROSS-REFERENCED TO RELATED APPLICATIONS

This patent application is a continuation of U.S. patent application Ser. No. 10/253,202, entitled "Method and System for Connecting A Subscriber To An Advertiser Prior To Call Completion," filed Sep. 24, 2002, now U.S. Pat No. 7,184,529 and assigned to the same assignee as this application. The aforementioned patent application is expressly incorporated herein, in its entirety, by reference.

FIELD OF THE INVENTION

The present invention relates to connecting a subscriber to an advertiser prior to call completion in a telecommunications network.

BACKGROUND OF THE INVENTION

In a typical telecommunications system, a subscriber dials a telephone number and waits for a ringing tone until the call is completed when the called party answers the telephone.

Often, a subscriber would prefer to hear information, such as an advertisement, while waiting for a telephone call to be completed. Such information might be paid for and provided by advertisers in exchange for reduced calling costs to the subscriber. For example, a new subscriber might need information on the location of local restaurants available in the subscriber's calling area. In addition, the subscriber may want the option to connect to the advertiser (e.g., to make a reservation at a restaurant) without finding and dialing the advertiser's telephone number. Accordingly, there is a need for a method and system to connect a telephone subscriber to an advertiser prior to call completion in a telecommunications network.

SUMMARY OF THE INVENTION

Embodiments of the present invention are directed to a method and system for connecting a subscriber to an advertiser prior to call completion in an intelligent telecommunications network. A subscriber telephone line is provisioned to receive advertisements which are stored in an originating switch in the telecommunications network. Once the subscriber dials a telephone number to call another party, the switch delays normal call processing and begins playing the advertisement to the subscriber. If the subscriber wishes to be connected to the advertiser, she may provide a predetermined input to the switch. The switch, upon receiving the predetermined input, retrieves routing information, including the telephone number associated with the advertiser, from a network component and connects the subscriber with the advertiser. If the subscriber does not wish to be connected to the advertiser, the subscriber may wait a predetermined period after playback of the advertisement to be automatically connected to the telephone number of the originally called party. In an alternative embodiment, the subscriber may cancel the advertisement during playback to be connected to the originally called party. The switches and network components in the telecommunications network may be advanced intelligent network (AIN) components.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

The following description of an embodiment of the present invention is made with reference to the above-described drawings wherein like numerals refer to like parts or components throughout the several figures. The present invention is directed to a method and system for connecting a subscriber to an advertiser prior to call completion in an intelligent telecommunications network.

Operating Environment

Figure 1:
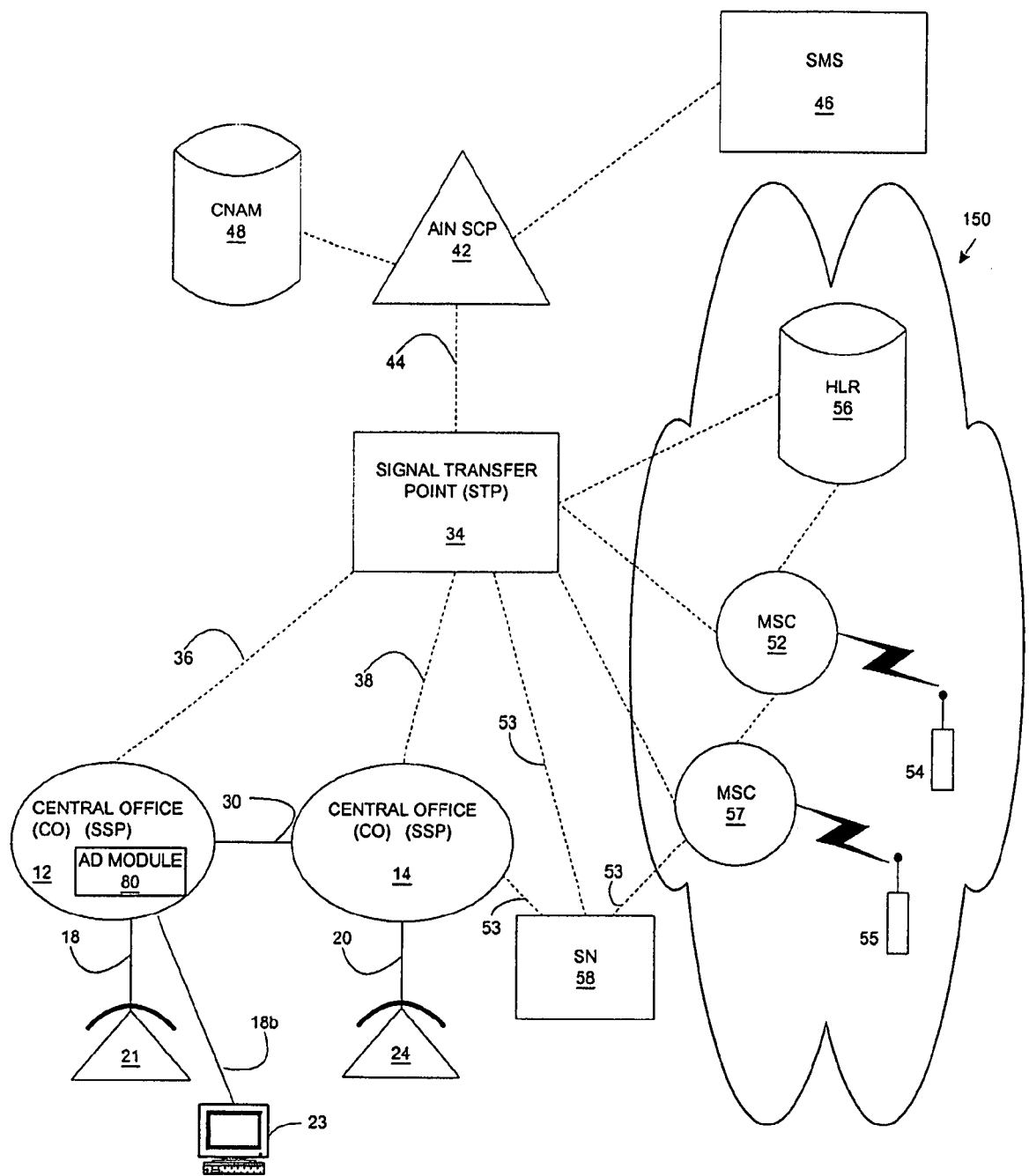
FIG. 1 is a simplified block diagram illustrating components of a wireline and wireless telecommunications network that provides an operating environment for the present invention.

FIG. 1 is a block diagram illustrating components of a wireline and wireless telephone network that provides an exemplary operating environment for the present invention. The public switched telephone network that evolved in the 1980s incorporated the advanced intelligent network (AIN). Some of the components of the advanced intelligent network are illustrated in FIG. 1. FIG. 1 is illustrative of at least a part of the advanced intelligent network (AIN) of a typical local exchange carrier integrated with components of a wireless network 150. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as the trunk circuit 30.

As shown in FIG. 1, switches (SSP) 12 and 14 have a plurality of subscriber lines 18 and 20 connected thereto.

Each of the subscriber lines 18 and 20 is connected to a terminating piece or pieces of customer premises equipment that are represented by telephones 21 and 24. A computer 23 also is illustrated as connected to the switch 12 via the subscriber line 18(b). The computer 23 is illustrative of a single or a plurality of computing and data storage devices. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point (STP) 34 via SS7 data link 44. As is known to those skilled in the art, service control points, such as the SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN are provided by regional STPs (not shown) and regional SCPs (not shown). The STP 34 is connected to the SSPs via connections 36, 38 and 40. Both the regional SCPs and the local SCP 42, which represent a plurality of local SCPs distributed throughout the AIN, are connected via respective data links to the SMS 46. The SMS 46 provides a centralized platform for remotely programming the various SCPs of the AIN so that a coordinated information processing scheme may be implemented for the AIN.

The modern Advanced Intelligent Network also includes service nodes (SN) such as the service node 58. Those skilled in the art are familiar with service nodes, which are physically implemented by the same types of computers that embody the SCP 42. In addition to the computing capability and data base maintenance features, service nodes 58 use ISDN lines and may include DTMF signal recognition devices, tone generation devices, text to speech (TTS) voice synthesis devices and other voice or data resources. As shown in FIG. 1, the connection is through the SSP. For example, SN 55 is connected to SCP 42 via ISDN links 53 to SSP 12, ISDN/SS7 protocol conversion in SSP 12, and SS7 links 38 and 44. According to a preferred embodiment, the ISDN links 53 serve as a primary rate interface (PRI) over which services may be provided to subscribers using wireline services such as the wireline telephone sets 21 and 24 and subscribers using wireless services such as the wireless units 54, 55, 60, and 62.

The wireless network 150, such as a cellular network, comprises a mobile switching center (MSC) 52. The MSC 52 is a switch providing services and coordination between wireless users in the network 150 and external networks. The MSC 52 may be connected to the STP 34 to provide information to the wireline network and receive information from the wireline network. The MSC 52 also communicates with a wireless subscriber, such as wireless telephones 54 and 55. The wireless telephones 54 and 55 are also illustrative of other wireless computing devices, such as pagers and personal digital assistants.

In operation, the intelligent network elements of the AIN, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 12 and 14, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

SSP 12 (the originating switch) also includes an advertising module 80 for storing and playing advertisements. Advertising module 80 may be a recording playback device for playing back recorded analog voice messages in digitized forms such as WAV or MP3 files. Although advertising module 80 is shown in FIG. 1 as being functionally integrated in SSP 12, in an alternative embodiment, advertising module 80 may also be functionally connected to the SSP as a component of the network. In this embodiment, advertising module 80 may be connected to SSP 12 via a PRI interface line similar to the connection 53 used to connect service node 58 to SSP 14. The originating switch may be provisioned by the subscriber's exchange carrier to play advertisements through advertising module 80 to the subscriber in exchange for reduced or discounted service. The advertisements may be pre-recorded WAV or MP3 audio files.

Operation

Having described an operating environment for the present invention with reference to FIG. 1, the following is a description of a logical flow of the steps performed by a method and system of the present invention for providing an advertisement to a subscriber prior to call completion in an intelligent telecommunications network.

Figure 2:
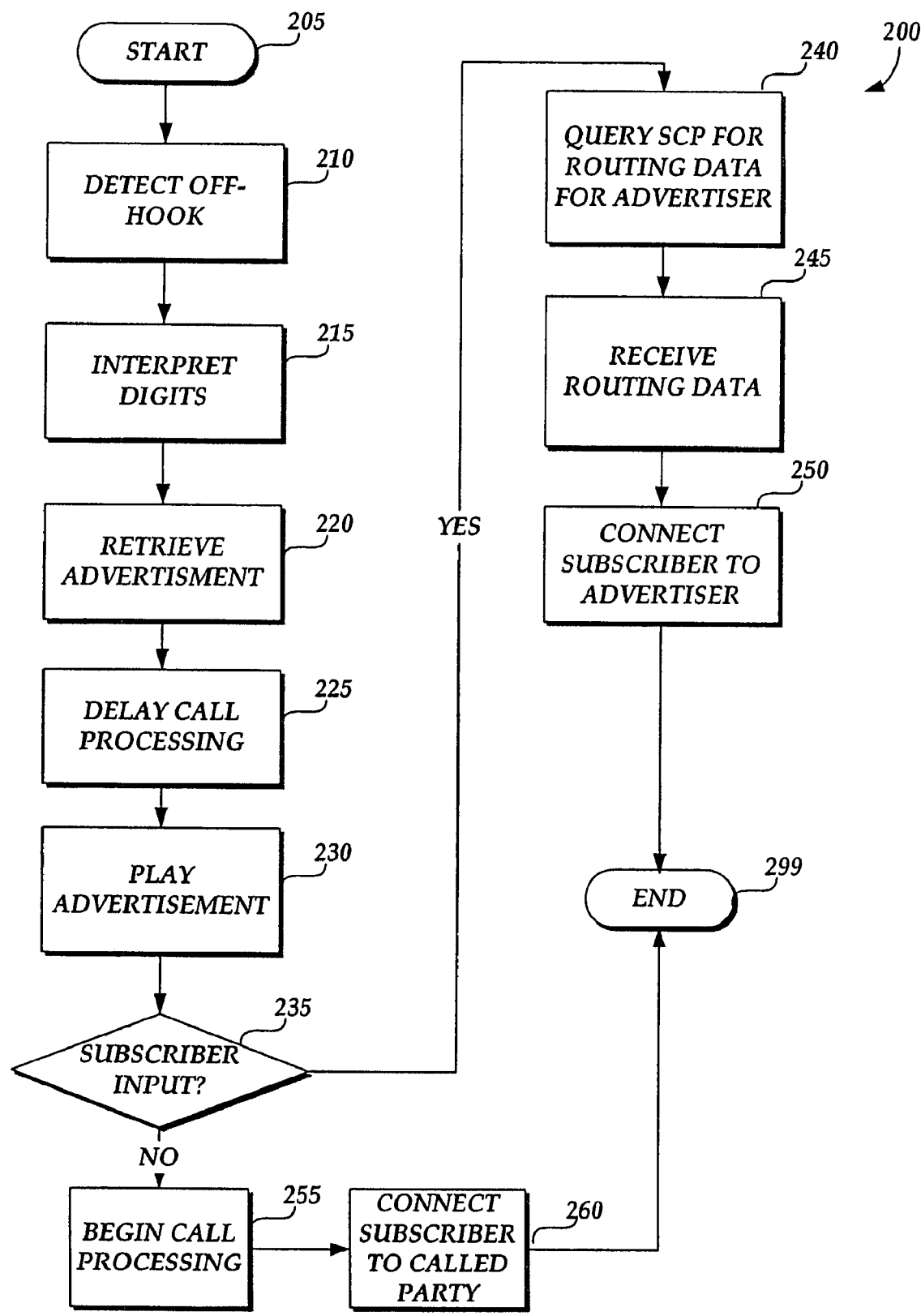
FIG. 2 illustrates a logical flow of the steps performed by a method and system of the present invention for connecting a subscriber to an advertiser prior to call completion in the telecommunications network of FIG. 1.

Referring then to FIG. 2, the method 200 begins at start step 205 and proceeds to step 210 where an originating switch (i.e., SSP 12 or MSC 52) detects an off-hook condition caused by a subscriber in preparation of making a telephone call. At step 215, the originating switch interprets each digit entered by the subscriber until it is able to determine how the call is to be processed by STP 34. For example, the originating switch may interpret the first seven or ten digits of the telephone number before messaging STP 34 that the call is a local call.

Once the originating switch has interpreted enough digits, it retrieves an advertisement to play over the subscriber's line at step 220 and delays the start of call processing (i.e., the switch waits to send the appropriate SS7 message to the SCP) at step 225. Call processing is delayed by the originating switch until the playing of the ad has been completed. As discussed above in reference to FIG. 1, the advertisement may be a prerecorded WAV or MP3 audio file. In this embodiment, the advertisement may be retrieved from advertisement module 80. Of course, the advertisement may also be stored in other network components such as SCP 42 or SN 55.

At step 230, the advertisement is played to the subscriber during the delay in call processing. For example, the subscriber may be provided with an announcement from a local advertiser such as "While you are waiting to be connected, please consider visiting our wonderful restaurant in your area. If you would like to be connected to make a reservation, please press the pound key on your telephone keypad."

At step 235, the originating switch waits to receive the keypad input requested from the subscriber. If the requested subscriber input is received (e.g., the subscriber presses the "#" key to connect to the advertiser), the originating switch sends a query message to SCP 42 requesting routing data associated with the advertiser at step 240. As discussed above in reference to FIG. 1, the originating switch (e.g., SSP 12) may be configured to interface with SCP 42 through the use of a trigger. In the present embodiment, the subscriber input would act as a trigger to cause the switch to generate the SS7 message to be sent to the SCP.

After the query message is sent to the SCP, the originating switch will continue to delay call processing until it receives a reply at step 245. In this embodiment, the reply may be a "response" message from the SCP instructing the originating switch to route the call to a telephone number associated with the advertiser. The routing information including the telephone number for the advertiser associated with the subscriber trigger may be stored in a database in the SCP. At step 250, the originating switch will route the call the advertiser.

Returning now to step 235, if no input is received from the subscriber within a predetermined period, the originating switch will "time out" and begin normal call processing at step 255 to connect the subscriber to the telephone number of the originally called party at step 260. In another embodiment, the subscriber may also have the option to cancel the advertisement during playback by depressing a key such as the * key on the telephone keypad. Once the advertisement has been canceled, the originating switch will begin normal call processing to connect the subscriber to the telephone number of the originally called party. The method 200 then ends at step 299.

Although various embodiments of the invention as described in FIG. 2 above utilizes an SCP, it should be understood that the invention is not limited to this network component. For example, a service node (SN) may also be utilized to perform some or all of the functions of the SCP in the above-described embodiments.

It will be apparent to those skilled in the art that various modifications and variations may be made in the present invention without departing from the scope or spirit of the invention. Other embodiments of the invention will be apparent to those skilled in the art from consideration of the specification and practice of the invention disclosed herein.

We claim:

1. A method for connecting a subscriber to an advertiser prior to call completion in a telecommunications network, the method comprising:

detecting an off-hook condition for the subscriber in the network prior to making a call to a party;

providing an advertisement from the advertiser to the subscriber prior to completing the call to the party; and in response to input by the subscriber, connecting the subscriber to the advertiser by routing the call to a telephone number associated with the advertiser and completing the call to the advertiser instead of completing the call to the party, wherein the telephone number associated with the advertiser is distinct from a telephone number entered by the subscriber for calling the party, and wherein if no input is received from the subscriber within a predetermined time period indicating that the subscriber desires to be connected to the advertiser, automatically beginning call processing to connect the subscriber to the called party.

2. The method of claim 1, further comprising:

after detecting an off-hook condition, interpreting digits of a telephone number entered by the subscriber for calling the party; and retrieving the advertisement.

3. The method of claim 1, wherein providing the advertisement from the advertiser to the subscriber prior to completing the call to the party comprises:

delaying the start of call processing;

retrieving the advertisement from within a service switching point in the communications network; and playing the advertisement to the subscriber.

4. The method of claim 3, wherein connecting the subscriber to the advertiser comprises:

while delaying call processing, requesting an input by the subscriber in response to the advertisement;

receiving the subscriber input;

in response to the subscriber input, querying a network component requesting routing data, wherein the routing data is associated with the advertiser;

receiving the routing data from the network component; and routing the call to a telephone number associated with the advertiser.

5. The method of claim 4, wherein the network component is a service control point (SCP).

6. The method of claim 3, further comprising terminating the advertisement during playback by depressing a predetermined key on a telephone keypad.

7. The method of claim 6, further comprising beginning call processing to connect the subscriber to the party if the advertisement is terminated.

8. A system for connecting a subscriber to an advertiser prior to call completion in a telecommunications network, the system comprising:
    means for detecting an off-hook condition for the subscriber in the network; and
    means for receiving an advertisement;
    means for playing the advertisement from the advertiser to the subscriber prior to completing a call to a party;
    means for connecting the subscriber to the advertiser; and
    a terminating switch having means for completing a call from the subscriber from the originating switch to the advertiser instead of the called party, wherein a telephone number associated with the advertiser is distinct from a telephone number entered by the subscriber for calling the party, and
    wherein if no input is received from the subscriber within a predetermined time period, the terminating switch having means for automatically beginning call processing to connect the subscriber to the called party.

9. The system of claim 8, further comprising:
    means for delaying call processing while providing the advertisement to the subscriber, wherein the advertisement is provided by retrieving the advertisement from within the originating switch;
    means for requesting an input by the subscriber in response to the advertisement;
    means for receiving the subscriber input;
    in response to the subscriber input, means for querying a network component requesting routing data, wherein the routing data is associated with the advertiser;
    means for receiving the routing data from the network component; and
    means for routing the call to a telephone number associated with the advertiser.

10. The system of claim 9, wherein the means for receiving subscriber input detects a predefined key on a telephone keypad.

11. The system of claim 9, wherein the network component is a service control point (SCP).

12. The system of claim 8 further comprising means for discounting subscriber service when the subscriber when an advertisement is played.

13. The system of claim 8 further comprising means for completing the call to the party upon the completion of call processing.

14. The system of claim 8 further comprising means for canceling the playing of the advertisement upon receiving a predetermined subscriber input from a telephone keypad.

15. The system of claim 14, wherein, upon receiving the predetermined subscriber input, the system is further operative to begin call processing to connect the subscriber to the party.

16. A computer-readable storage medium containing computer executable instructions which when executed by a computer will cause the computer to perform a method of performing actions on content in a region within a free form two-dimensional workspace, comprising the steps of:
    connecting a subscriber to an advertiser prior to call completion in a telecommunications network, the method comprising:
    detecting an off-hook condition for the subscriber in the network prior to making a call to a party;
    providing an advertisement from the advertiser to the subscriber prior to completing the call to the party; and
    in response to input by the subscriber, connecting the subscriber to the advertiser by routing the call to a telephone number associated with the advertiser and completing the call to the advertiser instead of completing the call to the party, wherein the telephone number associated with the advertiser is distinct from a telephone number entered by the subscriber for calling the party, and
    wherein if no input is received from the subscriber within a predetermined time period indicating that the subscriber desires to be connected to the advertiser, automatically beginning call processing to connect the subscriber to the called party.

17. The computer-readable storage medium of claim 16 further comprising: after detecting an off-hook condition, interpreting digits of a telephone number entered by the subscriber for calling the party; and retrieving the advertisement.

18. The computer-readable storage medium of claim 16, wherein providing the advertisement from the advertiser to the subscriber prior to completing the call to the party comprises: delaying the start of call processing; retrieving the advertisement from within a service switching point in the communications network; and playing the advertisement to the subscriber.

19. The computer-readable storage medium of claim 18, wherein connecting the subscriber to the advertiser comprises: while delaying call processing, requesting an input by the subscriber in response to the advertisement; receiving the subscriber input; in response to the subscriber input, querying a network component requesting routing data, wherein the routing data is associated with the advertiser; receiving the routing data from the network component; and routing the call to a telephone number associated with the advertiser.

20. The computer-readable storage medium of claim 18 further comprising terminating the advertisement during playback by depressing a predetermined key on a telephone keypad.

* * * * *